United States Patent Office 3,079,349
Patented Feb. 26, 1963

3,079,349
SILICONE RESIN FOAM CONTAINING ALUMINUM AND METHOD FOR MAKING SAME
Donald E. Weyer, Midland, Mich., assignor to Dow Corning Corporation, Midland, Mich., a corporation of Michigan
No Drawing. Filed Oct. 4, 1954, Ser. No. 460,232
5 Claims. (Cl. 260—2.5)

This invention relates to silicone resin foams of improved stability.

The advent of silicone resin foams has been a valuable addition to the art of thermal insulation and of reinforcing structural members because silicone resins are greatly superior in thermal stability to organic resins. Consequently, foams prepared from the silicone resins offer unique advantages in the insulation and structural art. To date, one of the disadvantages of silicone resin foams has been the decrease in strength at elevated temperatures. Sometimes this decrease amounts to 80 percent of the room temperature strength. This is due to a softening of the resin and not to a thermal decomposition. The presence of previously employed fillers such as diatomaceous earth, clay, metal oxides such as aluminum oxide and the like does not substantially effect this softening of the resin at elevated temperatures. This problem is serious inasmuch as silicone resins are designed primarily for use at elevated temperatures and consequently the full value of the foams could not be realized.

The applicant has found most unexpectedly that if powdered aluminum is incorporated in the silicone resin that the foams produced therefrom possess a vastly increased strength at temperatures of 500° F. and above.

It is a primary object of this invention to produce silicone resin foams of improved high temperature strength, higher dielectric constant, improved dimensional stability and of more uniform pore size. It is a further object of this invention to provide compositions of matter which are useful for reinforcing structural members designed to operate at elevated temperatures. Other objects and advantages will be apparent from the following description.

This invention relates to expanded silicone resin foams having a density of less than 50 lbs. per cu. foot which foams consist essentially of from 15 to 75 parts by weight of powdered aluminum per 100 parts by weight of an alkylphenylpolysiloxane resin having an average of from 1 to 1.6 total alkyl and phenyl radicals per silicon atom.

The polysiloxane resins employed in this invention are those which contain both alkyl radicals of less than 3 carbon atoms and phenyl groups. Thus the resins are copolymers of the following siloxane units: monoethylsiloxane, monophenylsiloxane, dimethylsiloxane, phenylmethylsiloxane, diphenylsiloxane, monoethylsiloxane, phenylethylsiloxane, diethylsiloxane and ethylmethylsiloxane. These various units are so proportioned that there is an average of from 1 to 1.6 total hydrocarbon radicals per silicon atom. These resins may be prepared by any of the conventional methods shown in the art.

The foams of this invention are prepared by mixing the resin and the powdered aluminum together with any desired blowing agent and any desired curing catalyst for silicone resins and thereafter expanding the mixture into a foam in any desired manner. Various methods which are suitable include melting the silicone resin and thereafter mixing in the powdered aluminum and the desired catalyst and blowing agent and thereafter heating the mass at a temperature sufficient to expand the resin and cure it. Alternatively, the resin may be mixed with the filler, catalyst and blowing agent, cooled and thereafter powdered. The powder may subsequently be expanded into a foam by heating from 30° C. to 300° C. or above.

A more detailed description of the methods of preparing these foams are described in U.S. Patent 2,655,485 and in the applicant's copending application Serial No. 415,951, filed March 12, 1954, now Patent No. 2,803,606.

Any suitable blowing agent may be employed to produce the foams of this invention. These include sodium bicarbonate, sulfonyl hydrazides such as P,P'-oxy-bis(benzenesulfonylhydrazide), nitroso compounds such as dinitrosopentamethylenetetraamine and hydrogen containing silicon compounds such as methylhydrogensiloxane, ethylhydrogensiloxane and the like. In order to use the hydrogen containing siloxanes it is necessary to have a hydroxylated compound such as butanol or a silanol present in the composition. This method is more fully described in the applicant's copending application Serial No. 452,215, filed August 25, 1954, now Patent No. 2,833,732.

Any suitable catalyst may be employed in making the compositions of this invention. Actually the presence of a catalyst is not essential although it is desirable since it lessens the danger of collapse of the foam during curing. Suitable catalysts include metal salts of carboxylic acids such as dibutyl-tin-diacetate and lead 2-ethylhexoate, amines, alkali metal hydroxides, ferric chloride, quaternary ammonium salts and any other of the known organosilicon resin setting catalysts.

The compositions of this invention may be used for thermal insulation, for the reinforcing of structural members and in any other application in which a combination of mechanical strength and thermal stability plus high dielectric constant is required.

The following examples are illustrative only and should not be construed as limiting the invention which is properly delineated in the appended claims.

*Example 1*

The siloxane resin employed in this example had the composition of 29.4 mol percent phenylmethylsiloxane, 32 mol percent monomethylsiloxane, 32.6 mol percent monophenylsiloxane and 6 mol percent diphenylsiloxane.

(1) The resin was heated to render it fluid and there was added thereto 25 parts by weight powdered aluminum, 3 parts by weight dinitrosopentamethylenetetraamine both based on 100 parts by weight of the resin and 1 cc. of 2-ethylhexoic acid per 300 g. of the resin. The resulting molten mass was then heated at 160° C. until the resin had expanded into a foam and the foam was thereafter cured 62 hours at 250° C.

(2) The above procedure was repeated except that 35 parts by weight aluminum powder per 100 parts by weight resin were employed. The physical properties of the resulting foam were as follows:

| Run | Density in lbs. per cu. ft. | Compressive Strength at 500° F. in p.s.i. | Dielectric Constant | Power Factor |
|---|---|---|---|---|
| 1 | 5.9 | 12 | 2.03 | .0010 |
| 2 | 11.5 | 58.5 | 4.05 | .0016 |
| Blank | 11 | 1.5 | | |

NOTE.—The blank was a foam prepared from an identical resin without the aluminum powder.

*Example 2*

The siloxane resin employed in this example was composed of 63 mol percent monomethylsiloxane, 28 mol percent monophenylsiloxane and 9 mol percent diphenylsiloxane. 100 parts by weight of this resin was melted and mixed with 15 parts by weight powdered aluminum and 3 parts by weight dinitrosopentamethylenetetraamine and with 1 cc. of 2-ethylhexoic acid per 300 g. of the resin.

A second formulation was prepared from 100 parts by weight of the resin, 25 parts by weight powdered aluminum, 3 parts by weight dinitrosopentamethylenetetraamine and 3 cc. of 2-ethylhexoic acid per 300 g. of the resin.

A third formulation was prepared employing 100 parts by weight of the resin, 35 parts by weight powdered aluminum, 3 parts by weight dinitrosopentamethylenetetraamine and 1 cc. of 2-ethylhexoic acid per 300 g. of the resin.

Each of these 3 formulations was formed into a foam and cured in accordance with the procedure of Example 1.

A fourth foam was prepared in an identical manner except that the filler was 20 parts by weight diatomaceous earth per 100 parts by weight of the resin.

A fifth foam was prepared in an identical manner except that no filler was employed. The properties of the resultant foams are shown below:

| Foam | Density in lbs. per cu. ft. | Compressive Strength at 500° F. in p.s.i. | Dielectric Constant | Power Factor |
|---|---|---|---|---|
| 1 | 5 | 4.9 | 1.43 | .00047 |
| 2 | 14.2 | 97.3 | | |
| 3 | 8 | 23.9 | 2.98 | .00015 |
| 4 | 14 | 23.3 | | |
| 5 | 13.7 | 17.5 | | |

The room temperature strength of resin 3 was 194 p.s.i., while that of resin 5 was 243 p.s.i.

It should be understood that valid comparisons of the strengths can be made only between resins of approximately the same density, i.e., between 2, 4 and 5 and not between 1, 3 and 4 or 5.

That which is claimed is:

1. An expanded foam having a density of less than 50 pounds per cubic foot consisting essentially of from 15 to 75 parts by weight of powdered aluminum per 100 parts by weight of an alkylphenylpolysiloxane resin having an average of from 1 to 1.6 inclusive total alkyl radicals of less than 3 carbon atoms and phenyl groups per silicon atom.

2. A composition which when heated above the decomposition temperature of the blowing agent will expand into a foam having a density of less than 50 pounds per cubic foot consisting essentially of 15 to 75 parts by weight powdered aluminum per 100 parts by weight of an alkylphenylpolysiloxane resin having on the average from 1 to 1.6 inclusive total alkyl radicals of less than 3 carbon atoms and phenyl radicals per silicon atom, a blowing agent and a curing catalyst for the siloxane resin.

3. A foam in accordance with claim 1 wherein the siloxane resin is a methylphenylpolysiloxane.

4. A composition in accordance with claim 2 wherein the siloxane resin is a methylphenylpolysiloxane.

5. A method for making a cellular silicone resin which comprises mixing about 57% to 75% by weight methyl phenyl silicone resin with about 25% to 43% by weight of finely powdered aluminum; heating the mixture to a temperature of at least about 350° F. and for a period of time sufficient to form a cellular article; and then heating the resultant cellular article at a temperature and for a period of time sufficient to stabilize said article.

References Cited in the file of this patent
UNITED STATES PATENTS

| | | |
|---|---|---|
| 2,507,519 | Goodwin | May 16, 1950 |
| 2,568,672 | Warrick | Sept. 18, 1951 |
| 2,577,280 | Simon et al. | Dec. 4, 1951 |
| 2,655,485 | Hoffman | Oct. 13, 1953 |
| 2,683,673 | Silversher | July 13, 1954 |
| 2,743,192 | White | Apr. 24, 1956 |

OTHER REFERENCES

Rochow: "Chemistry of Silicones," 2nd edition, 1951, pages 139–140.

UNITED STATES PATENT OFFICE
CERTIFICATE OF CORRECTION

Patent No. 3,079,349            February 26, 1963

Donald E. Weyer

It is hereby certified that error appears in the above numbered patent requiring correction and that the said Letters Patent should read as corrected below.

Column 1, lines 52 and 53, for "monoethylsiloxane" read -- monomethylsiloxane --.

Signed and sealed this 15th day of September 1964.

SEAL)
Attest:

ERNEST W. SWIDER            EDWARD J. BRENNER
Attesting Officer            Commissioner of Patents